US011715225B2

(12) United States Patent
Goto et al.

(10) Patent No.: US 11,715,225 B2
(45) Date of Patent: Aug. 1, 2023

(54) GROUND INTERSECTION ESTIMATING METHOD, GROUND INTERSECTION ESTIMATING DEVICE, AND PROGRAM

(71) Applicant: NIPPON TELEGRAPH AND TELEPHONE CORPORATION, Tokyo (JP)

(72) Inventors: Takashi Goto, Musashino (JP); Ryuji Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 285 days.

(21) Appl. No.: 17/282,952

(22) PCT Filed: Oct. 4, 2019

(86) PCT No.: PCT/JP2019/039280
§ 371 (c)(1),
(2) Date: Apr. 5, 2021

(87) PCT Pub. No.: WO2020/080138
PCT Pub. Date: Apr. 23, 2020

(65) Prior Publication Data
US 2021/0374984 A1 Dec. 2, 2021

(30) Foreign Application Priority Data
Oct. 18, 2018 (JP) ................................ 2018-196311

(51) Int. Cl.
G06T 7/60 (2017.01)
(52) U.S. Cl.
CPC ..................................... G06T 7/60 (2013.01)

(58) Field of Classification Search
CPC ... G06T 7/60; G06T 2207/30184; G06T 7/62; G06T 19/00; G01B 11/02; G01B 21/00; G01B 21/02
See application file for complete search history.

(56) References Cited

U.S. PATENT DOCUMENTS

2017/0116707 A1* 4/2017 Upendran ............... G06T 17/05

FOREIGN PATENT DOCUMENTS

JP 2012-105416 * 5/2012
JP 2014-153336 * 8/2014
(Continued)

OTHER PUBLICATIONS

Machine Translation for JP 2012-105416 (Year: 2012).*
(Continued)

Primary Examiner — Qian Yang
(74) Attorney, Agent, or Firm — Harness, Dickey & Pierce, P.L.C.

(57) ABSTRACT

An object of the present invention is to provide a ground boundary estimation method, a ground boundary estimation apparatus, and a program that can acquire the elevation of the ground boundary of the electrical pole quickly and accurately even when the base of the electrical pole is shielded by any shield at observation of the electrical pole. According to the ground boundary estimation method of the present invention, a difference in height between the columnar shape of a three-dimensional model of a columnar object such as an observed electrical pole and a standard shape of the columnar object at a position in which the three-dimensional model and the standard shape are equal to each other in the horizontal dimension is determined, and a penetration depth prescribed by the standard is subtracted from the difference in height, to find a height of a shielded portion of the ground boundary of the columnar object.

5 Claims, 11 Drawing Sheets

(56) References Cited

FOREIGN PATENT DOCUMENTS

| | | | |
|---|---|---|---|
| JP | 201578849 A | | 4/2015 |
| JP | 2015-224980 | * | 12/2015 |
| JP | WO2016/139819 | * | 9/2016 |
| JP | WO2018/159468 | * | 9/2018 |

OTHER PUBLICATIONS

Machine Translation for JP 2014-153336 (Year: 2014).*
Machine Translation for JP 2015-224980 (Year: 2015).*
Machine Translation for JP WO 2016/139819 (Year: 2016).*
Machine Translation for JP WO 2018/159468 (Year: 2018).*
Morgenroth et al., "Assessment of tree structure using a 3D image analysis technique—A proof of concept", Urban Forestry & Urban Greening 13 (2014) 198-203 (Year: 2014).*
Mitsubishi Mobile Mapping System High-precision GPS movement measuring device, literature, Mar. 28, 2016, http://www.mitsubishielectric.co.jp/mma/https://www.mitsubishielectric.co.jp/mms/pdf/mms.pdf.

* cited by examiner

GROUND INTERSECTION ESTIMATING METHOD, GROUND INTERSECTION ESTIMATING DEVICE, AND PROGRAM

CROSS-REFERENCE TO RELATED APPLICATIONS

This application is a 371 U.S. National Phase of International Application No. PCT/JP2019/039280 filed on Oct. 4, 2019, which claims priority to Japanese Application No. 2018-196311 filed on Oct. 18, 2018. The entire disclosures of the above applications are incorporated herein by reference.

TECHNICAL FIELD

The present disclosure relates to a ground boundary estimation method, a ground boundary estimation apparatus, and a program that estimate the position of a ground boundary (boundary between the ground and a columnar object) in three-dimensional modelling of a columnar object such as an electrical pole using a point group or the like.

BACKGROUND ART

According to a method using point group point data measured by a measuring vehicle called MMS (see Non Patent Literature 1, for example), a three-dimensional object (electrical pole 3D model) of an electrical pole is generated to acquire the shape, position, and elevation of the electrical pole (see Patent Literature 1, for example). The electrical pole 3D model is a CAD model that preserves the shape of the electrical pole, and information such as the center point and radius of the cross section of the electrical pole at a certain height of the electrical pole can be acquired from the 3D model. For example, to accurately know the setting position of the electrical pole from the electrical pole 3D model, it is necessary to acquire the elevation of a connection surface (ground boundary) between the electrical pole and the ground.

CITATION LIST

Patent Literature

Patent Literature 1: JP 2015-078849 A

Non Patent Literature

Non Patent Literature 1: "Mitsubishi Mobil Mapping System With High Accuracy GPS Mobile Measurement Device", http://www.mitsubishielectric.co.jp/mms/, https:/www.mitsubishielectric.co.jp/mms/pdf/mms.pdf (Searched on Sep. 25, 2018)

SUMMARY OF THE INVENTION

Technical Problem

However, since the vicinity of the base of the electrical pole is shielded by any shield such as a hedge or a guardrail at generation of the electrical pole 3D model, a point group is not generated on the electrical pole so that the lowest surface of the electrical pole 3D model may not coincide with the ground boundary. In this case, when the electrical pole 3D model is generated up to the top surface of the electrical pole, the elevation of the ground boundary can be easily calculated using standard length and penetration depth of the electrical pole. However, the electrical pole 3D model is not necessarily generated up to the top surface of the electrical pole, and in such case, disadvantageously, it is difficult to acquire the elevation of the ground boundary.

For example, there is a system that presents the elevation at specified coordinates, such as the Geographical Survey Institute map (the Geographical Survey Institute, http://maps.gsi.go.jp/). In the case where coordinates of the center point of the electrical pole are previously acquired by the MMS measurement described above or the like, even when the base of the electrical pole is shielded by any the shield, the elevation of the ground boundary can be acquired by using the above-mentioned system.

However, the acquisition of the coordinates of the electrical pole by the MMS measurement or the like and the use of another system complicate the processing, which makes it difficult to shorten the processing time. Further, since the elevation accuracy of the map system depends on location, it has been difficult to make accurate measurement.

Therefore, in order to solve the problem described above, an object of the present invention is to provide a ground boundary estimation method, a ground boundary estimation apparatus, and a program that can acquire the elevation of the ground boundary of an electrical pole quickly and accurately even when a base of the electrical pole is shielded by any shield at observation of the electrical pole.

Means for Solving the Problem

In order to achieve the object described above, according to the ground boundary estimation method of the present invention, a difference in height between the columnar shape of a three-dimensional model of a columnar object such as an observed electrical pole and a standard shape of the columnar object at a position in which the three-dimensional model and the standard shape of the columnar object are equal to each other in the horizontal dimension is determined, and a penetration depth prescribed by the standard is subtracted from the difference in height, to determine a height of a shielded portion of the ground boundary of the columnar object.

Specifically, a ground boundary estimation method according to the present invention includes an external data input step of receiving an input of a three-dimensional model of an observed columnar object partially embedded in a ground and shaped such that horizontal dimension is uniquely defined with respect to height; an internal data input step of receiving an input of a standard shape of the observed columnar object; and a calculation step of acquiring a difference in height between the three-dimensional model and the standard shape of the observed columnar object at a position in which the three-dimensional model and the standard shape of the observed columnar object are equal to each other in the horizontal dimension, subtracting a standard length of an embedded portion of the observed columnar object in the ground from the difference in height to calculate a length of an unobservable shielded portion shielded at observation of the observed columnar object, and calculating a ground boundary elevation of the observed columnar object from a height of the three-dimensional model and the length of the shielded portion.

The ground boundary estimation apparatus according to the present invention includes an external data input unit configured to receive an input of a three-dimensional model of an observed columnar object partially embedded in a ground and shaped such that the horizontal dimension is uniquely defined with respect to height; an internal data input unit configured to receive an input of a standard shape of the observed columnar object; and a calculation unit configured to acquire a difference in height between the three-dimensional model and the standard shape of the observed columnar object at a position in which the three-dimensional model and the standard shape of the observed columnar object are equal to each other in the horizontal dimension, and subtract a standard length of an embedded portion of the observed columnar object in the ground from the difference in height to calculate a length of unobservable shielded portion shielded at observation of the observed columnar object, and calculate a ground boundary elevation of the observed columnar object from a height of the three-dimensional model and the length of the shielded portion.

According to the present invention, the three-dimensional model of the observed electrical pole is compared with the stored standard truncated cone to acquire the length of the shielded portion. Thus, the present invention can provide a ground boundary estimation method and a ground boundary estimation apparatus that can acquire the elevation of the ground boundary of an electrical pole quickly and accurately even when a base of the electrical pole is shielded by any shield at observation of the electrical pole.

Preferably, the ground boundary estimation method according to the present invention further includes combining the ground boundary elevation calculated in the calculating step, with at least one of a known elevation closest to the observed columnar object, a ground boundary elevation of the observed columnar object, the ground boundary elevation being estimated by detecting an accessory attached to a predetermined position of the observed columnar object and using the height of the detected accessory, and other elevations to calculate a combined ground boundary elevation of the observed columnar object.

Preferably, the calculation unit of the ground boundary estimation apparatus of the present invention combines the calculated ground boundary elevation with at least one of a known elevation closest to the observed columnar object, a ground boundary elevation of the observed columnar object, the ground boundary elevation being estimated by detecting an accessory attached to a predetermined position of the observed columnar object and using the height of the detected accessory, and other elevations to calculate a combined ground boundary elevation of the observed columnar object.

The estimation accuracy of the ground boundary elevation is improved by combining information acquired by another technique as well.

The program according to the present invention is a program causing a computer to function as the ground boundary estimation apparatus. The ground boundary estimation apparatus according to the present invention can also be realized by a computer and a program, and can also record a program in a recording medium and provide a program through a network.

Effects of the Invention

The present invention can provide a ground boundary estimation method, a ground boundary estimation apparatus, and a program that can acquire the elevation of the ground boundary of the electrical pole quickly and accurately even when the base of the electrical pole is shielded by any shield at observation of the electrical pole.

DESCRIPTION OF EMBODIMENTS

Hereinafter, embodiments of the present invention will be described with reference to the drawings. The embodiments described below are examples of the present invention, and the present invention is not limited to the following embodiments. In this specification and the drawings, constituent elements having the identical reference signs are assumed to be the same.

Figure 1:
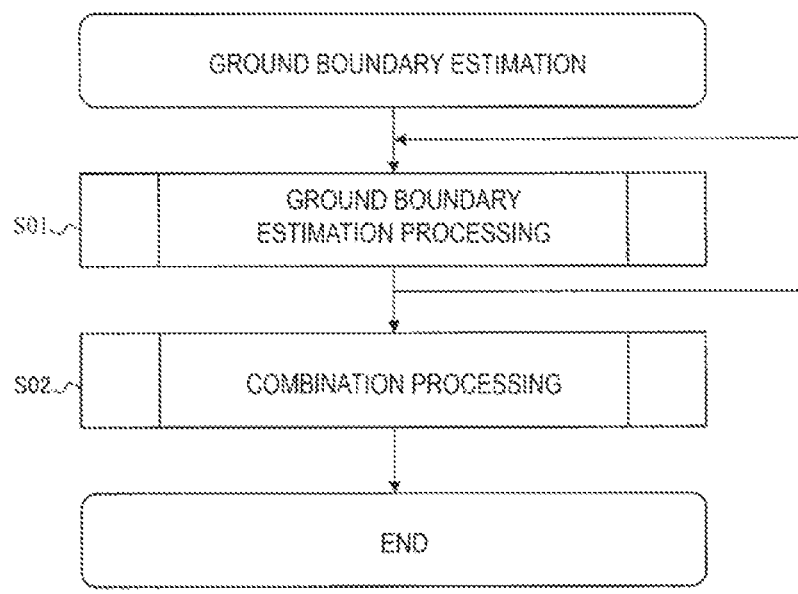
FIG. 1 is a flowchart illustrating a ground boundary estimation method according to the present invention.

FIG. 1 is a flowchart illustrating a ground boundary estimation method according to the present embodiment. According to the ground boundary estimation method, at least one estimation processing of the shielded ground boundary is executed (Step S01), and processing of combining the results, for example, averaging processing is executed (Step S02). There are a plurality of methods for the ground boundary estimation processing executed in Step S01. The methods will be described below.

Ground Boundary Estimation Method 1

Figure 2:
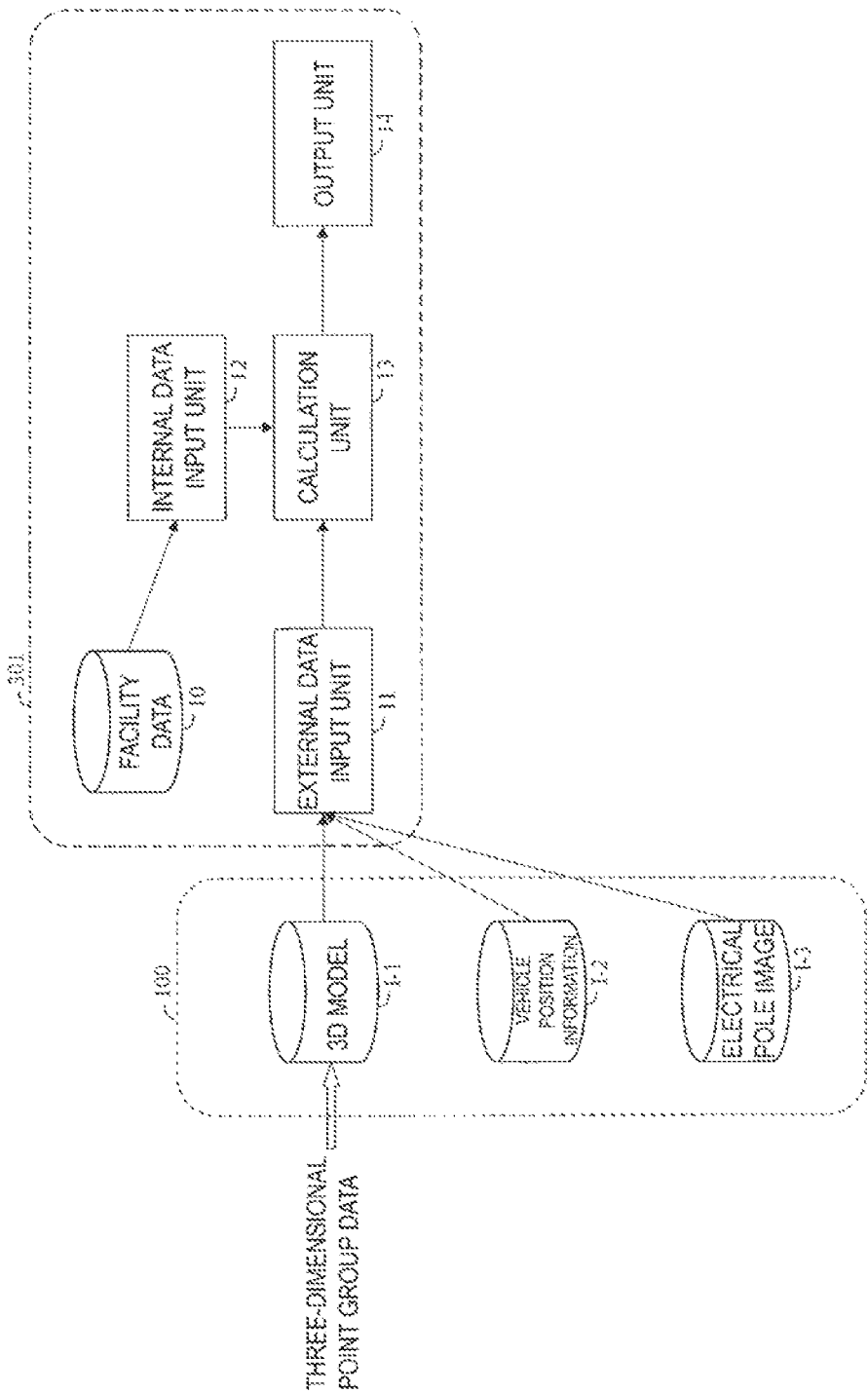
FIG. 2 is a block diagram for explaining a ground boundary estimation apparatus according to the present invention.

FIG. 2 is a block diagram illustrating a ground boundary estimation apparatus 301 according to the present embodiment. The ground boundary estimation apparatus 301 includes:

an external data input unit 11 that receives an input of a three-dimensional model of an observed columnar object partially embedded in a ground and shaped such that horizontal dimension is uniquely defined with respect to height;

an internal data input unit 12 that receives an input of a standard shape of the observed columnar object; and a calculation unit 13 that acquires a difference in height between the three-dimensional model and a standard shape of the observed columnar object at a position in which the three-dimensional model and the standard shape of the observed columnar object are equal to each other in the horizontal dimension, and subtracts a standard length embedded in the ground in the observed columnar object from the difference in height to calculate a length of unobservable shielded portion shielded at observation of the observed columnar object, and calculates a ground boundary elevation of the observed columnar object based on a height of the three-dimensional model and the length of the shielded portion.

The columnar object is, for example, an object shaped like a truncated cone when the object to be observed is an electrical pole.

The ground boundary estimation apparatus 301 may include facility data 10 that stores the standard shape of an object shaped like a truncated cone such as the electrical pole.

An MMS 100 is an observing vehicle as described in Non Patent Literature 1, and acquires three-dimensional (XYZ) coordinates of a point on the surface of an outdoor structure as three-dimensional point group data while traveling on a road. For example, the MMS 100 irradiates surroundings with laser light, acquires the direction, distance, and height of a reflection point from the elevation angle and direction of the irradiated laser light and time taken until the laser light is reflected and returns, and acquires the above-mentioned three-dimensional (XYZ) coordinates on the basis of the own position acquired using GPS.

Then, the MMS 100 generates a 3D model I-1 of the electrical pole or the like by a method as described in Patent Literature 1. Patent Literature 1 describes a facility state detection method for accurately detecting the actual state of a facility such as electrical pole, cable, or closure, and determining the actual state of the facility. According to the method described in Patent Literature 1, first, the MMS acquires three-dimensional point group data corresponding to points on the surface of an outdoor structure. Then, according to the method in Patent Literature 1, the position (XY coordinates) of the electrical pole to be inspected from stored facility management data (for example, which may be the facility data 10 in FIG. 2) is acquired, and a predetermined cylindrical space centered at the acquired position is formed and then, only data contained in the cylindrical space is selected from the acquired three-dimensional point group data. Then, according to the method in Patent Literature 1, an arc is searched for from plane projection points at any height among the selected data. Here, according to the method in Patent Literature 1, in the case where an arc can be detected from a plurality of planar projection points, a circle and its center point for each planar projection point are calculated from the arc detected from the plurality of planar projection points, specifications of the electrical pole are acquired from the stored facility management data, the specifications are compared with the circle and the center point calculated for each planar projection point to detect the electrical pole (truncated cone) to generate 3D model I-1 of the electrical pole.

The facility management data stored in the facility data 10 is data acquired at installation of the electrical pole, and is, for example, Optos data (see http://www.joem.or.jp/2017-3-2.pdf) describing the position (coordinates) and type (pole length and design strength) of the electrical pole using the electrical pole name as a key.

Here, the 3D model I-1 generated by the MMS 100 has the following problems. The boundary (ground boundary) between the outdoor structure and the ground is not always visible from the MMS 100. When any shield such as guardrail, parked vehicle, and mounding is present, the MMS 100 cannot acquire the three-dimensional (XYZ) coordinates of the portion including the ground boundary shielded by the shield. In such case, the MMS 100 alone cannot accurately acquire the elevation of the ground boundary of the outdoor structure.

Thus, the ground boundary estimation apparatus 301 estimates the ground boundary elevation of the outdoor structure as follows.

The ground boundary estimation apparatus 301 performs: an external data input step of receiving an input of a three-dimensional model of an observed columnar object partially embedded in a ground and shaped such that horizontal dimension is uniquely defined with respect to height; an internal data input step of receiving an input of a standard shape of the observed columnar object; and a calculation step of acquiring a difference in height between the three-dimensional model and the standard shape of the observed columnar object at a position in which the three-dimensional model and the standard shape of the observed columnar object are equal to each other in the horizontal dimension, subtracting a standard length of an embedded portion of the observed columnar object in the ground from the difference in height to calculate a length of unobservable shielded portion shielded at observation of the observed columnar object, and calculating a ground boundary elevation of the observed columnar object from a height of the three-dimensional model and the length of the shielded portion.

Figure 3:
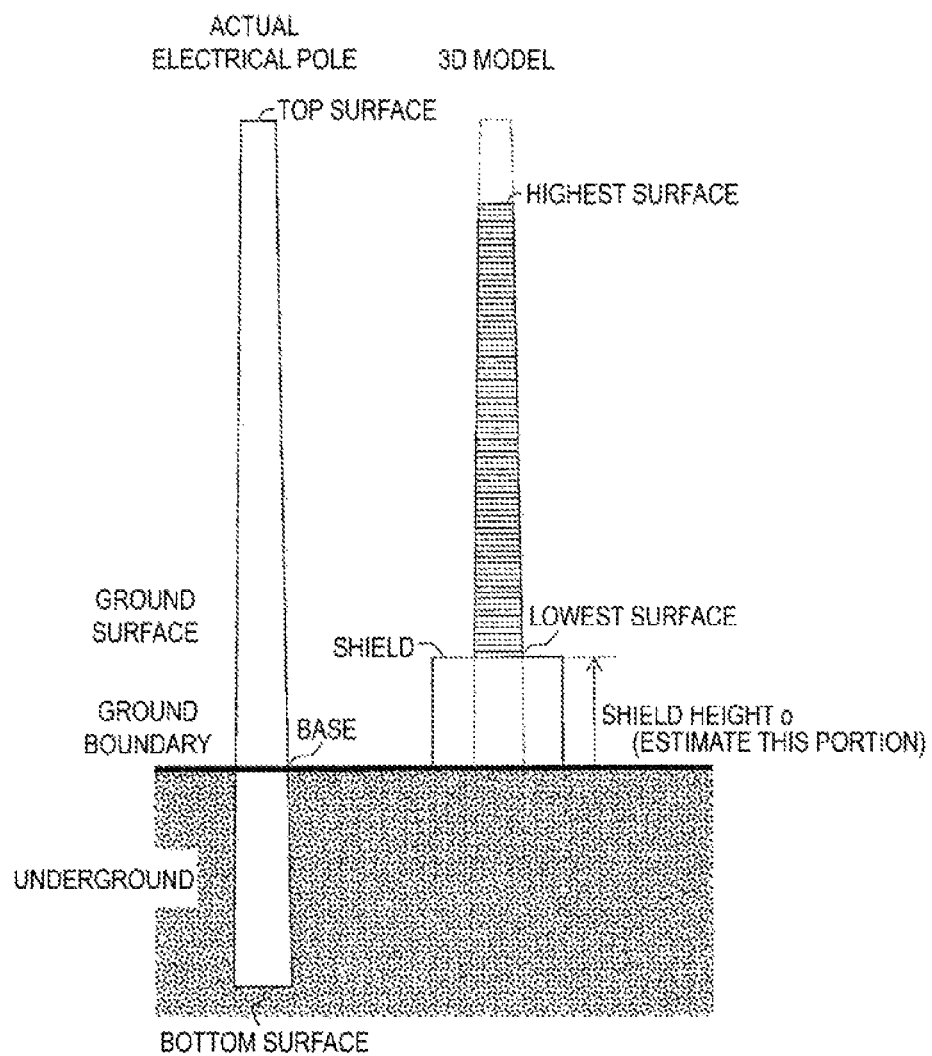
FIG. 3 is a diagram for describing names of an electrical pole, a shielded portion, and each part.

First, in the external data input step, the external data input unit 11 receives the 3D model I-1 of the electrical pole shielded by any shield, for example from the MMS 100. Subsequently, in the internal data input step, the internal data input unit 12 receives information on the electrical pole (for example, the standard shape of the electrical pole) from the facility data 10. Then, in the calculation step, the calculation unit 13 calculates a height o of the shield as illustrated in FIG. 3.

For example, the electrical pole has a taper of $\frac{1}{75}$. In a typical method, $\frac{1}{6}$ of the total length is embedded in the ground. The diameter of the bottom surface and the diameter of the top surface are also defined by standards for each pole type.

For example, when the diameter of the bottom surface is 20 cm and the pole length is 9 m, the diameter at the ground boundary is 0.2 [m]−(9 [m]×$\frac{1}{6}$×$\frac{1}{75}$)=0.18 [m].

That is, when there is no shield, the diameter of the lowest surface of the 3D model I-1 of the electrical pole is 18 cm. On the contrary, when the ground boundary is shielded by any shield, the diameter of the lowest surface of the 3D model I-1 of the electrical pole is smaller than 18 cm. For example, it is 17.25 cm. In this case, the height of the lowest surface of the 3D model I-1 from the ground can be estimated from a difference in diameter between the original bottom surface and the lowest surface of the 3D model I-1.

Figure 4:
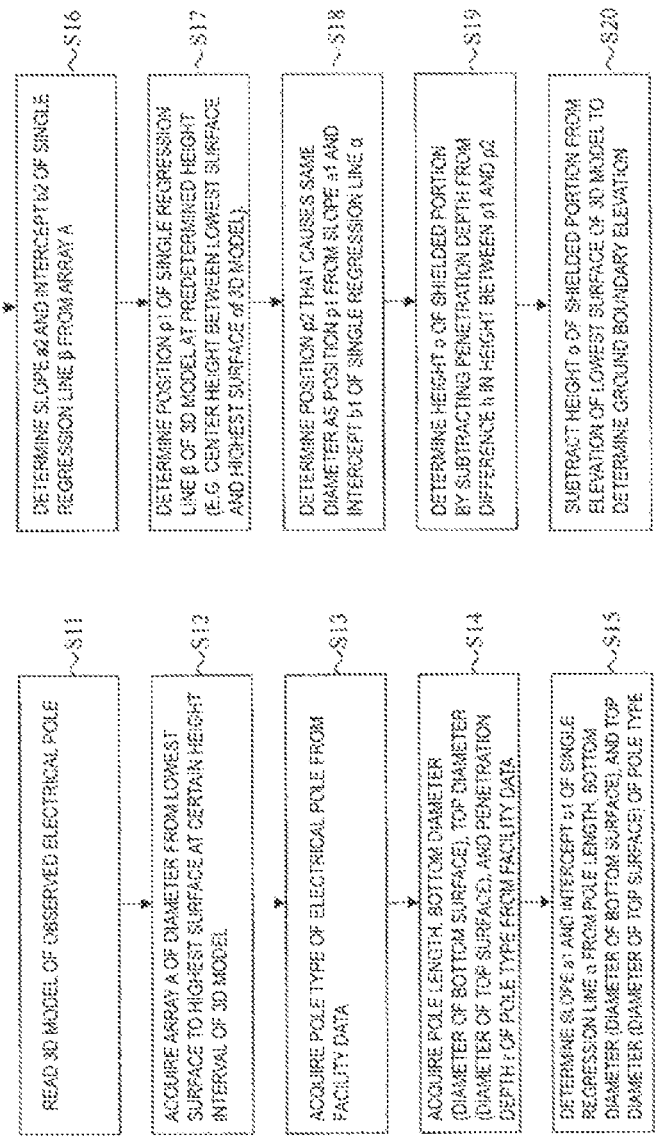
FIG. 4 is a flowchart illustrating a ground boundary estimation method according to the present invention.
Figure 6:
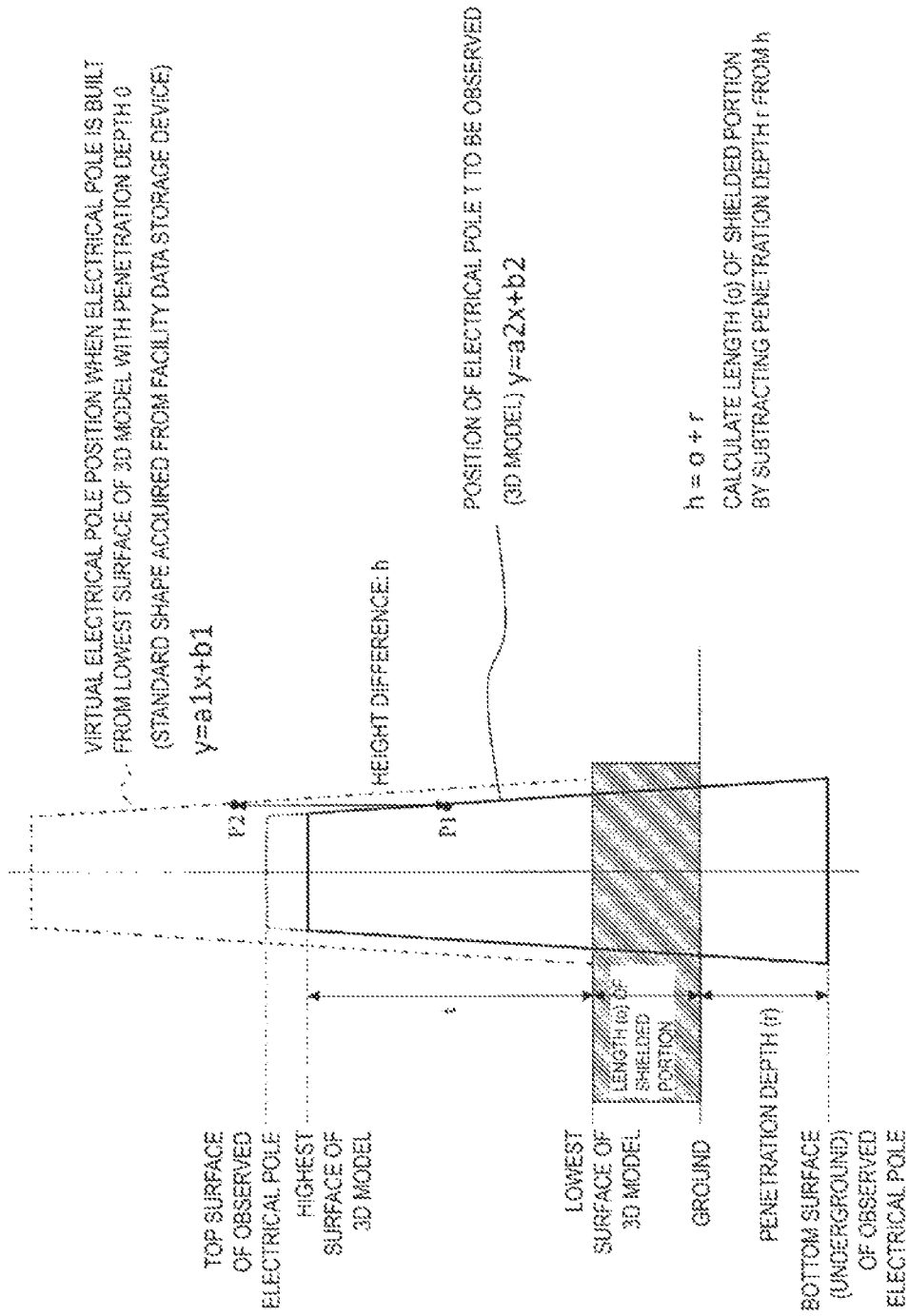
FIG. 6 is a diagram illustrating a ground boundary estimation method according to the present invention.

An estimation method performed by the calculation unit 13 is illustrated in a flowchart in FIG. 4. The flowchart in FIG. 4 is an example of Step S01 in FIG. 1. FIG. 6 is an image describing the estimation method.

First, the calculation unit 13 reads the 3D model I-1 of the observed electrical pole (Step S11). The calculation unit 13 analyzes the 3D model I-1, and acquires an array A of the diameters from the lowest surface to the highest surface at a certain height interval of the electrical pole (Step S12).

Next, the calculation unit 13 acquires, from the facility data 10, a pole type of the electrical pole based on the center coordinates of the observed electrical pole (Step S13). Furthermore, the calculation unit 13 acquires, from the facility data 10, standard shape of the pole type (pole length, bottom diameter (diameter of the bottom surface), top diameter (diameter of the top surface), and penetration depth r) (Step S14). Then, the calculation unit 13 determines a slope a1 and an intercept b1 of a single regression line α in FIG. 5 from the pole length, the bottom diameter (diameter of the bottom surface), and the top diameter (diameter of the top surface) (Step S15).

Figure 5:
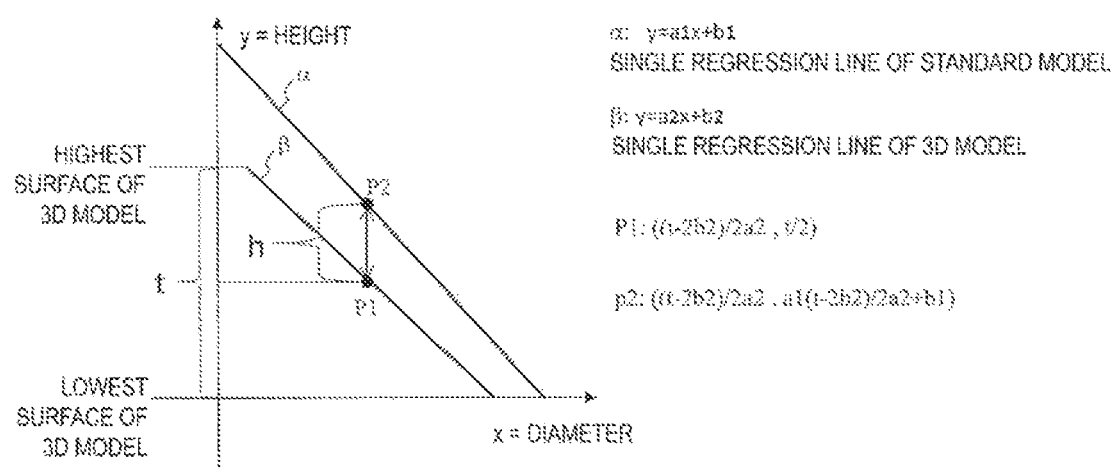
FIG. 5 is an explanatory diagram illustrating the ground boundary estimation method according to the present invention.

The calculation unit 13 also determines a slope a2 and an intercept b2 of a single regression line β in FIG. 5 from the array A from the lowest surface to the highest surface of the 3D model I-1 (Step S16). Then, the calculation unit 13 acquires the heights (elevations) of the lowest surface and the highest surface of the 3D model I-1 of the electrical pole, and determines a diameter X1 at a position p1 of the single regression line β at a predetermined height, for example, a center height between the lowest surface and the highest surface of the 3D model I-1 (given that a difference in height between the lowest surface and the highest surface is t, a height found by adding t/2 to the height of the lowest surface) (step S17). As illustrated in FIG. 6, the calculation unit 13 also aligns the bottom surface of the standard shape of the pole type with the lowest surface of the 3D model I-1, and determines a position p2 causing the diameter X1 from the single regression line a as in the graph in FIG. 5 (Step S18). The calculation unit 13 subtracts the penetration depth r from the difference h between the height at the position p1 and the height at the position p2 to determine the height o of the shielded portion (see Step S19, FIG. 6). Finally, the calculation unit 13 subtracts the height o of the shielded portion from the height (elevation) of the lowest surface of the 3D model I-1 to determine the ground boundary elevation (Step S20).

Ground Boundary Estimation Method 2

Figure 7:
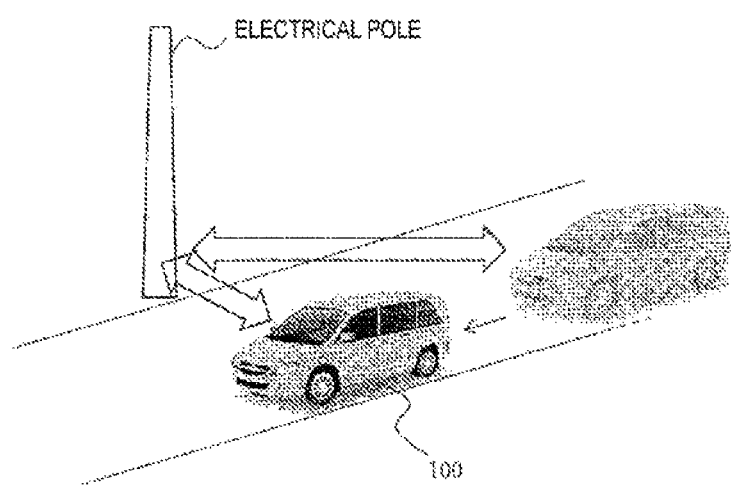
FIG. 7 is a diagram for explaining the ground boundary estimation method according to the present invention.

FIG. 7 is a diagram for explaining the ground boundary estimation method. As illustrated in FIG. 2, the MMS 100 can acquire vehicle position information I-2 including the position and the elevation of the MMS 100 itself by GPS or the like while traveling on the road. The external data input unit 11 of the ground boundary estimation apparatus 301 receives the vehicle position information I-2 from the MMS 100. Furthermore, the external data input unit 11 of the ground boundary estimation apparatus 301 also receives the 3D model I-1 of the electrical pole to be observed from the MMS 100. The calculation unit 13 calculates the ground boundary elevation of the electrical pole using the elevation in the vehicle position information I-2 received when MMS 100 is closest to the electrical pole.

Figure 8:
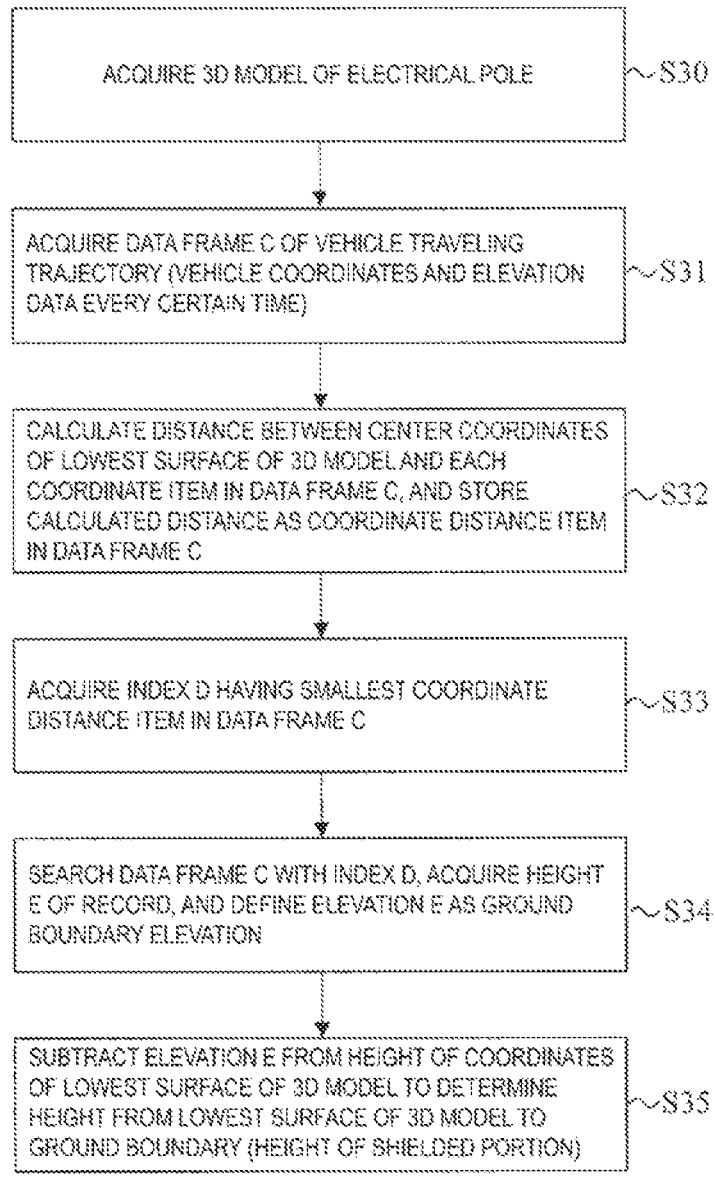
FIG. 8 is a flowchart illustrating the ground boundary estimation method according to the present invention.

FIG. 8 is a flowchart illustrating the ground boundary estimation method. First, the calculation unit 13 acquires the 3D model I-1 described above from the MMS 100 via the external data input unit 11 (Step S30). The calculation unit 13 acquires the vehicle position information I-2 from the MMS 100 via the external data input unit 11 (Step S31). The vehicle position information I-2 includes a data frame C of a vehicle traveling trajectory (vehicle coordinates and elevation data every certain time). The calculation unit 13 calculates a distance from center coordinates of the lowest surface of the 3D model I-1 and vehicle coordinates of a coordinate items in the data frame C, and stores the distance as a coordinate distance item in the data frame C (Step S32). The calculation unit 13 detects the data frame C (index D) having the smallest distance from among these data frames C (Step S33). The calculation unit 13 searches the data frame C with the index D, acquires the elevation E of the record, and defines the elevation as the ground boundary elevation (Step S34). The calculation unit 13 may further subtract the elevation E from the elevation of the lowest surface of the 3D model to determine the height o of the shielded portion (Step S35).

Note that in steps S33 and S44, the elevation E may be calculated by using not only the record having the smallest distance, but also the second, third, . . . smallest records and averaging them, and the calculated elevation E may be defined as the ground boundary elevation.

Ground Boundary Estimation Method 3

Figure 9:
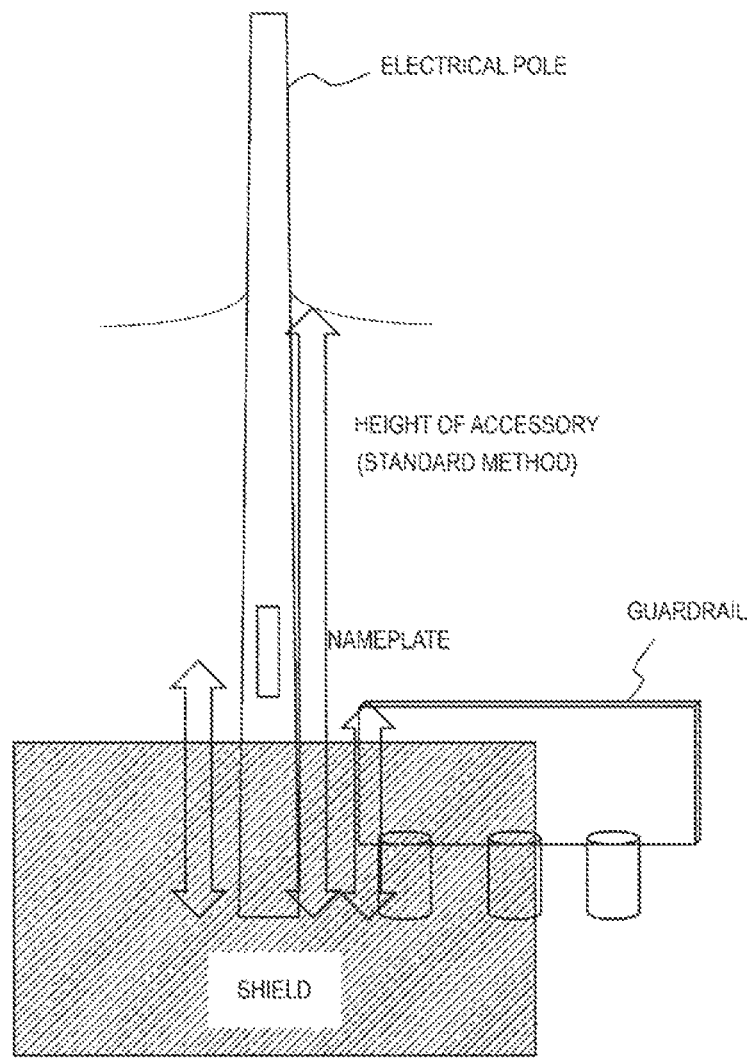
FIG. 9 is a diagram for explaining the ground boundary estimation method according to the present invention.
Figure 10:
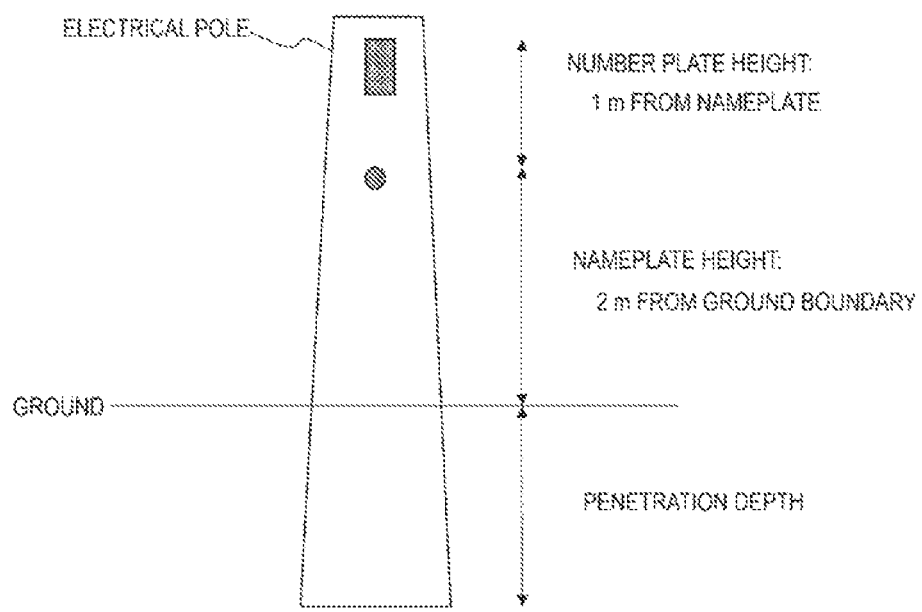
FIG. 10 is a diagram for explaining the ground boundary estimation method according to the present invention.

FIG. 9 is a diagram for explaining the ground boundary estimation method. According to the ground boundary estimation method, the ground boundary elevation is estimated using an attachment or an accessory of the electrical pole installed at a predetermined height as illustrated in FIG. 10. As illustrated in FIG. 2, the MMS 100 may acquire an electrical pole image I-3 using a camera or the like while traveling on the road. The external data input unit 11 of the ground boundary estimation apparatus 301 receives the electrical pole image I-3 from the MMS 100. Furthermore, the external data input unit 11 of the ground boundary estimation apparatus 301 also receives the 3D model I-1 of the electrical pole to be observed from the MMS 100. The calculation unit 13 superimposes the 3D model I-1 and the electrical pole image I-3, and calculates the ground boundary elevation using the attachment or the accessory.

For example, the height of a cable attached to the electrical pole is prescribed. A difference between a length from the lowest surface of the 3D model I-1 to the height of the cable and a prescribed value of the height of the cable is referred to as a height o of the shielded portion. In addition to the cable, accessories (nameplates and the like) having a prescribed height can be used in the ground boundary estimation method. In addition, any neighboring object having a prescribed standard height (for example. guardrail) other than the electrical pole accessories may be used in the ground boundary estimation method.

Figure 11:
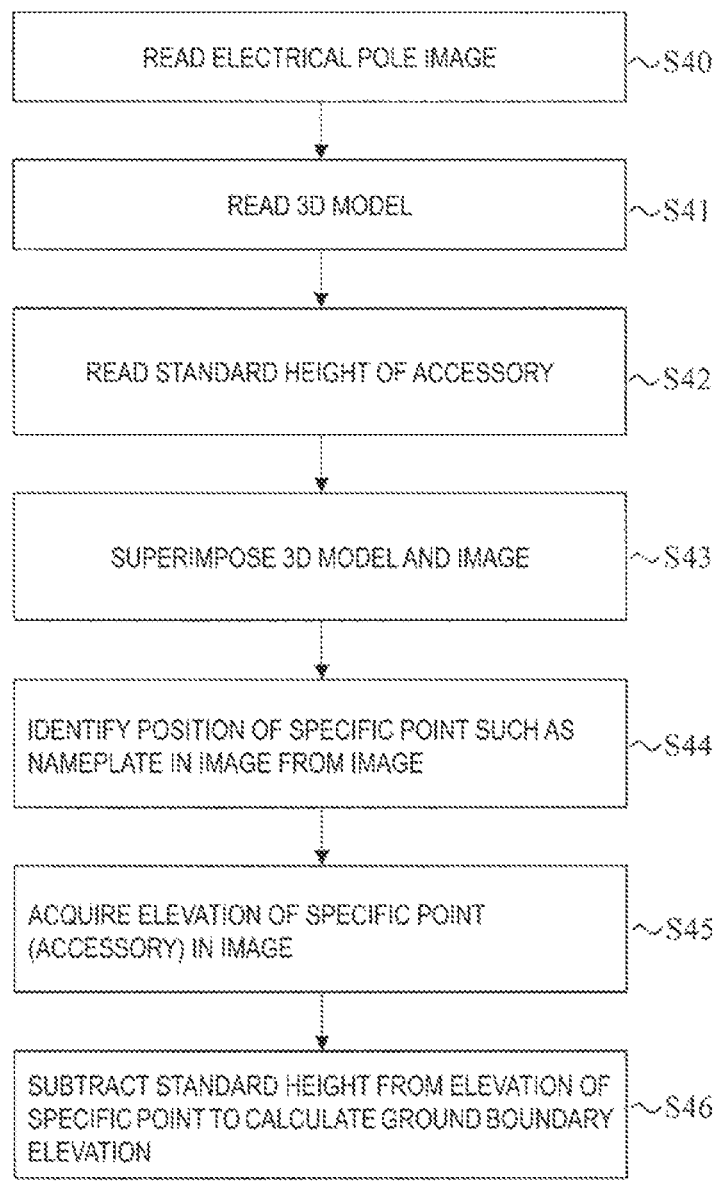
FIG. 11 is a flowchart illustrating the ground boundary estimation method according to the present invention.

FIG. 11 is a flowchart illustrating the ground boundary estimation method. First, the calculation unit 13 acquires the electrical pole image I-3 and the 3D model I-1 from MMS 100 via the external data input unit 11 (Steps S40, S41). The calculation unit 13 reads the cable installation position, nameplate, and standard heights of the nameplate and the like from the facility data 10 via the internal data input unit 11 (Step S42). The calculation unit 13 superimposes the electrical pole image I-3 and the 3D model I-1 (Step S43). The calculation unit 13 identifies the position of a specific point such as the nameplate in the image from the superimposed image (Step S44). The calculation unit 13 acquires the elevation of the specific point (height of the installation position, height of the nameplate height, or the like) identified in Step S44 (Step S45). The calculation unit 13 subtracts the standard height from the elevation of the specific point and calculates the ground boundary elevation (Step S46).

Combination Processing

The calculation unit 13 may execute the combining processing in Step S02 in FIG. 1. In the combination processing, the ground boundary elevation calculated in the calculation step (elevation acquired by the ground boundary estimation method 1) and at least one of a known elevation closest to the columnar object (the elevation acquired by the ground boundary estimation method 2), the ground boundary elevation of the columnar object, which is estimated by detecting an accessory attached to a predetermined position of the columnar object and using a height of the detected accessory (the elevation acquired by the ground boundary estimation method 3), and other elevations are combined to calculate a combined ground boundary elevation of the columnar object.

Here, "combine" means calculating an average value, a median value, or any other statistical value of the elevation acquired by the respective ground boundary estimation methods. Note that, in the combination processing, the elevation acquired by any other method than the above-described ground boundary estimation methods 1 to 3 may be used.

The calculation unit 13 outputs a result of the combination processing to the output unit 14.

Example

Step S01
Ground boundary elevation estimated by the ground boundary estimation method 1: 15.949 m (penetration depth of 2.66 m, distance from the bottom surface of the 3D model to the ground boundary of 0.51 m)
Ground boundary elevation estimated by the ground boundary estimation method 2: 16.030 m (distance from the vehicle to the electrical pole of 10.0 m)
Ground boundary elevation estimated by the ground boundary estimation method 3: 16.300 m (ground boundary of the nameplate of 18.50 m, prescribed height of the nameplate of 2.2 m)

Step S02
The average value of the ground boundary elevations acquired in Step S01 is calculated.
Ground boundary elevation average value: 16.094 m

REFERENCE SIGNS LIST

10 Facility data
11 External data input unit
12 Internal data input unit
13 Calculation unit
14 Output unit
100 MIMS
301 Ground boundary estimation apparatus

The invention claimed is:

1. A ground boundary estimation method comprising:
an external data input step of receiving an input of a three-dimensional model of an observed columnar object partially embedded in a ground and shaped such that horizontal dimension is uniquely defined with respect to height;
an internal data input step of receiving an input of a standard shape of the observed columnar object; and
a calculation step of acquiring a difference in height between the three-dimensional model and the standard shape of the observed columnar object at a position in which the three-dimensional model and the standard shape of the observed columnar object are equal to each other in the horizontal dimension, subtracting a standard length of an embedded portion of the observed columnar object in the ground from the difference in height to calculate a length of an unobservable shielded portion shielded at observation of the observed columnar object, and calculating a ground boundary elevation of the observed columnar object from a height of the three-dimensional model and the length of the shielded portion.

2. The ground boundary estimation method according to claim 1, further comprising combining
the ground boundary elevation calculated in the calculating step, with
at least one of a known elevation closest to the observed columnar object, a ground boundary elevation of the observed columnar object, the ground boundary elevation being estimated by detecting an accessory attached to a predetermined position of the observed columnar object and using the height of the detected accessory, and other elevations
to calculate a combined ground boundary elevation of the observed columnar object.

3. A ground boundary estimation apparatus comprising:
a processor; and
a storage medium having computer program instructions stored thereon, when executed by the processor, perform to:
receive an input of a three-dimensional model of an observed columnar object partially embedded in a ground and shaped such that horizontal dimension is uniquely defined with respect to height;
receive an input of a standard shape of the observed columnar object; and
acquire a difference in height between the three-dimensional model and the standard shape of the observed columnar object at a position in which the three-dimensional model and the standard shape of the observed columnar object are equal to each other in the horizontal dimension, and subtract a standard length of an embedded portion of the observed columnar object in the ground from the difference in height to calculate a length of unobservable shielded portion shielded at observation of the observed columnar object, and calculate a ground boundary elevation of the observed columnar object from a height of the three-dimensional model and the length of the shielded portion.

4. The ground boundary estimation apparatus according to claim 3, wherein the computer program instructions further perform to combine the calculated ground boundary elevation with at least one of a known elevation closest to the observed columnar object, a ground boundary elevation of the observed columnar object, the ground boundary elevation being estimated by detecting an accessory attached to a predetermined position of the observed columnar object and using the height of the detected accessory, and other elevations to calculate a combined ground boundary elevation of the observed columnar object.

5. A non-transitory computer-readable medium having computer-executable instructions that, upon execution of the instructions by a processor of a computer, cause the computer to function as the ground boundary estimation apparatus according to claim 3.

* * * * *